United States Patent
Surazhsky et al.

(10) Patent No.: US 9,792,671 B2
(45) Date of Patent: Oct. 17, 2017

(54) CODE FILTERS FOR CODED LIGHT DEPTH ACQUISITION IN DEPTH IMAGES

(71) Applicant: INTEL CORPORATION, Santa Clara, CA (US)

(72) Inventors: Vitaly Surazhsky, Yokneam Illit (IL); Michael Bronstein, Lugano (CH); Alex Bronstein, Haifa (IL); Ron Kimmel, Haifa (IL); Erez Sperling, D.N. Menashe (IL); Aviad Zabatani, Even Yehuda (IL); Ohad Menashe, Haifa (IL); David H. Silver, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 14/978,574

(22) Filed: Dec. 22, 2015

(65) Prior Publication Data

US 2017/0178294 A1 Jun. 22, 2017

(51) Int. Cl.
  *G06T 5/00* (2006.01)
  *G06T 5/20* (2006.01)

(52) U.S. Cl.
  CPC ............. *G06T 5/002* (2013.01); *G06T 5/20* (2013.01); *G06T 2207/10028* (2013.01);
  (Continued)

(58) Field of Classification Search
  CPC . G06T 5/002; G06T 5/20; G06T 2207/10028; G06T 2207/20004;
  (Continued)

(56) References Cited

U.S. PATENT DOCUMENTS

| | | | |
|---|---|---|---|
| 7,088,862 B1 * | 8/2006 | Silver | G06K 9/32 382/199 |
| 2004/0062307 A1 * | 4/2004 | Hallapuro | H04N 19/139 375/240.13 |

(Continued)

FOREIGN PATENT DOCUMENTS

EP   2547095 A1   1/2013

OTHER PUBLICATIONS

Siddiqi et al. ("Geometric shock-capturing ENO schemes for subpixel interpolation, computation, and curve evolution," IEEE Proceedings of International Symposium on Computer Vision, Nov. 21-23, 1995).*

(Continued)

*Primary Examiner* — Yubin Hung
(74) *Attorney, Agent, or Firm* — Alpine Technology Law Group LLC

(57) ABSTRACT

A mechanism is described for facilitating code filters for coded light depth acquisition in depth images at computing devices according to one embodiment. A method of embodiments, as described herein, includes detecting a code image of an object comprising pixels of code values and pixels of metadata values including confidence and code transition locations, and computing a vertical filter to be applied to the code image to smooth out the code transitions along vertical directions. The method further include computing a horizontal filter to be applied to the code image to smooth out the code transitions along horizontal directions, and computing a consistency filter to be applied to the code image to increase an accuracy of the code values and mark inconsistent pixels as invalid. The method may further include applying at least one of one or more of the vertical filter, the horizontal filter, and the consistency filter to filter the digital (Continued)

image, and outputting the filtered code image comprising filtered code values and filtered metadata values.

25 Claims, 11 Drawing Sheets

(52) U.S. Cl.
CPC ............... *G06T 2207/20004* (2013.01); *G06T 2207/20021* (2013.01); *G06T 2207/20032* (2013.01); *G06T 2207/20182* (2013.01)

(58) Field of Classification Search
CPC . G06T 2207/20021; G06T 2207/20032; G06T 2207/20182
See application file for complete search history.

(56) References Cited

U.S. PATENT DOCUMENTS

| | | |
|---|---|---|
| 2005/0135700 A1 | 6/2005 | Anderson |
| 2006/0104538 A1 | 5/2006 | Izumi |
| 2008/0232716 A1 | 9/2008 | Plagne |
| 2009/0180541 A1* | 7/2009 | Gao ..................... H04N 19/134 375/240.16 |
| 2011/0274366 A1 | 11/2011 | Tardif |
| 2012/0163460 A1* | 6/2012 | Chien .................. H04N 19/523 375/240.16 |

OTHER PUBLICATIONS

Chen et al. ("An Efficient and Accurate Method for Real-Time Processing of Light Stripe Images," Advances in Mechanical Engineering, vol. 5, Jan. 2013).*

Bailey, Donald G ("Sub-pixel Profiling," 5th International Conference on Information Communications & Signal Processing, Dec. 6-9, 2005).*

Song et al. ("Grid point extraction and coding for structured light system," Opt. Eng. 50(9), Sep. 9, 2011).*

International Search Report and Written Opinion received for International Application No. PCT/US2016/059934, dated Feb. 9, 2017, 14 pages.

* cited by examiner

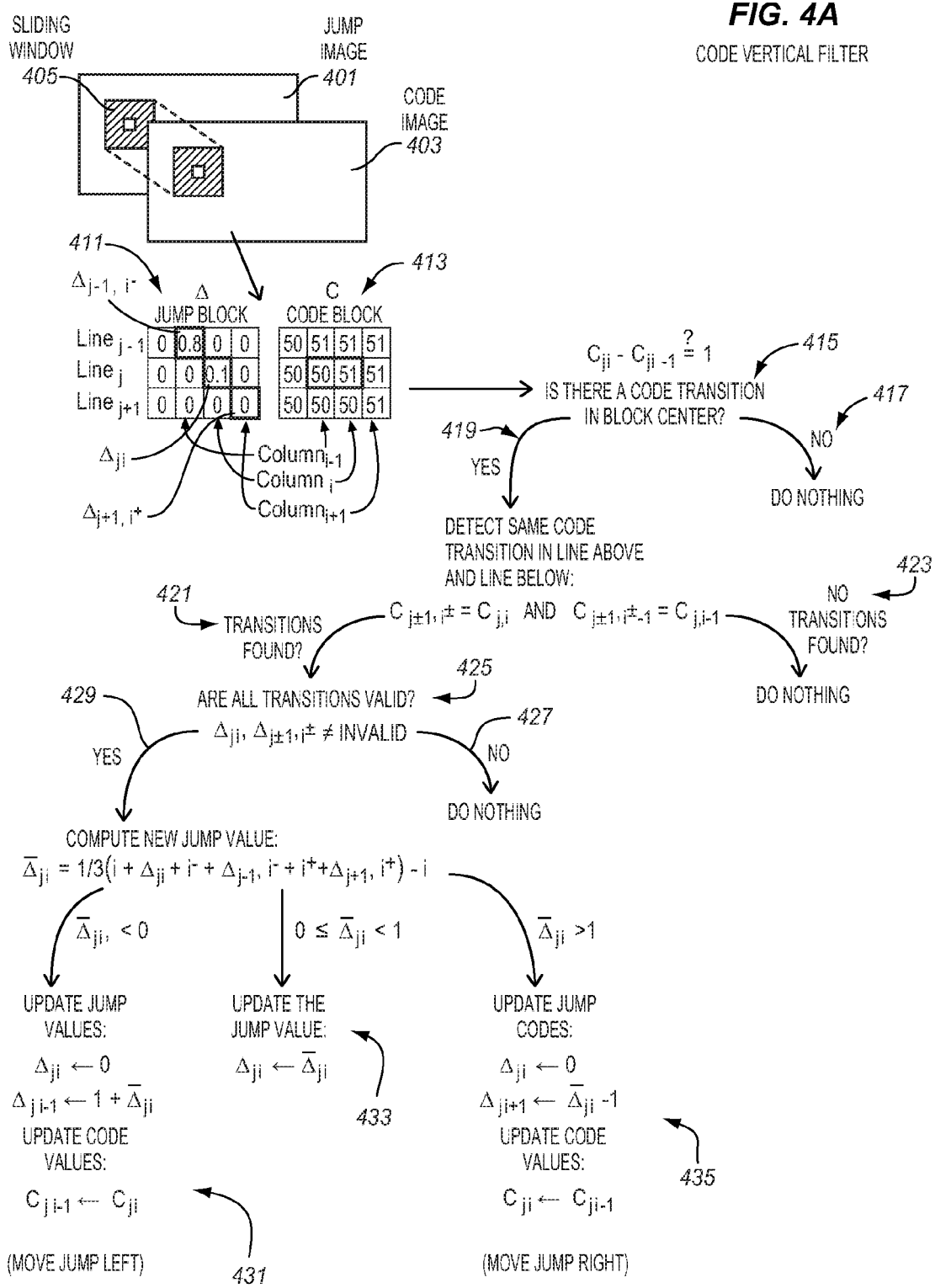

HORIZONTAL FILTER

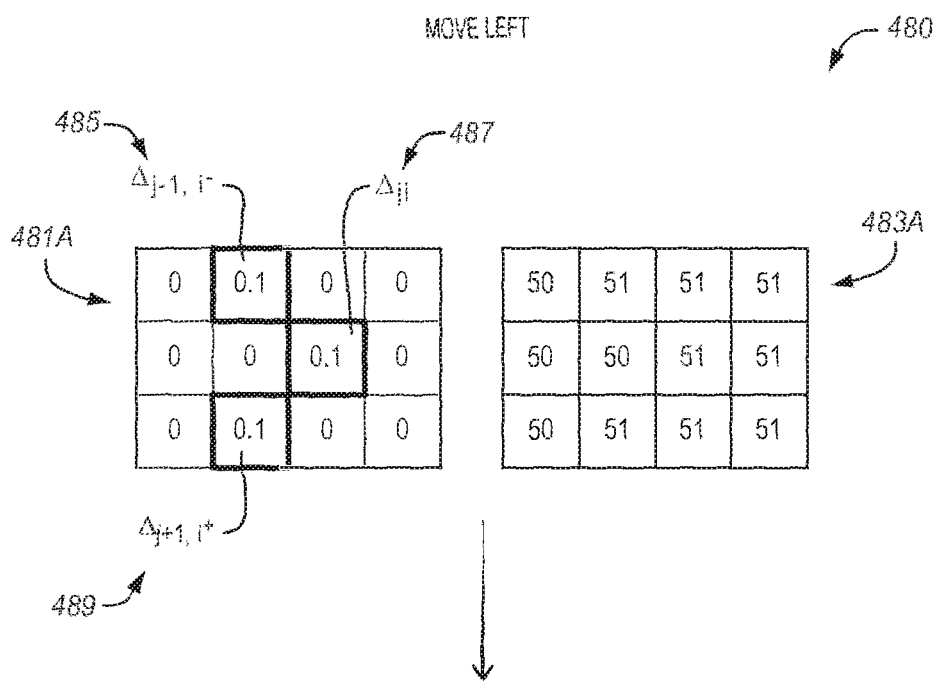
FIG. 4C
MOVE LEFT
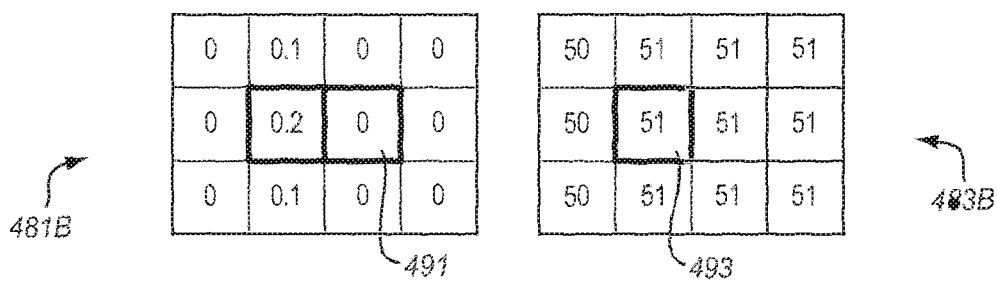

CODE FILTERS FOR CODED LIGHT DEPTH ACQUISITION IN DEPTH IMAGES

FIELD

Embodiments described herein generally relate to computers. More particularly, embodiments relate to code filters for coded light depth acquisition in depth images at computing devices.

BACKGROUND

In a coded-light three-dimensional (3D) camera, such as Intel® RealSense®, the scene is illuminated by a sequence of binary code patterns (e.g., vertical stripes of different width), which are then captured by the camera. The resulting sequence of images captured by the camera undergoes binarization, producing in each pixel seen by the camera a binary code representing a one-dimensional (1D) coordinate in a projector system of coordinates; using the code, it is possible to infer the depth of the scene by triangulation from the known relative positions of the camera and a projector. The accuracy of code estimation depends on the quality of the underlying binarization process, which may vary at each pixel. Binarization process provides a level of confidence, which can be used as an indicator of the confidence of the code estimation in a pixel.

Another aspect of discussion is code discontinuities, such as the points in which the code transitions from 0 to 1 or vice versa. In principle, these transitions contain all the information about the depth of the scene, and thus, ideally, it is desirable to determine the code transition locations with sub-pixel precision.

It is contemplated that the quality of the code accuracy can have a dramatic effect on the resulting depth image quality since the triangulation process amplifies errors. Typically, errors in the code image are translated into saw-tooth-like artifacts in the final depth image. Therefore, it is desired to obtain the highest possible code image.

Furthermore, imaging moving scenes (in which some objects are moving) may result in displacement of code patterns with respect to each other, leading to inconsistent code values.

It is desirable to provide a way to improve the quality of the code image taking into account the code estimation confidence, and in particular, pixels in which code transitions are estimated with higher precision. Simple filtering of the code image by conventional filters (e.g., bilateral filter) does not account for special structure of the code and may only increase artifacts instead of reducing them.

BRIEF DESCRIPTION OF THE DRAWINGS

Embodiments are illustrated by way of example, and not by way of limitation, in the figures of the accompanying drawings in which like reference numerals refer to similar elements.

FIG. 4A illustrates a transaction sequence for computing and applying a code vertical filter according to one embodiment.

FIG. 4C illustrates a transaction sequence for moving a jump to the left according to one embodiment.

DETAILED DESCRIPTION

Figure 1:
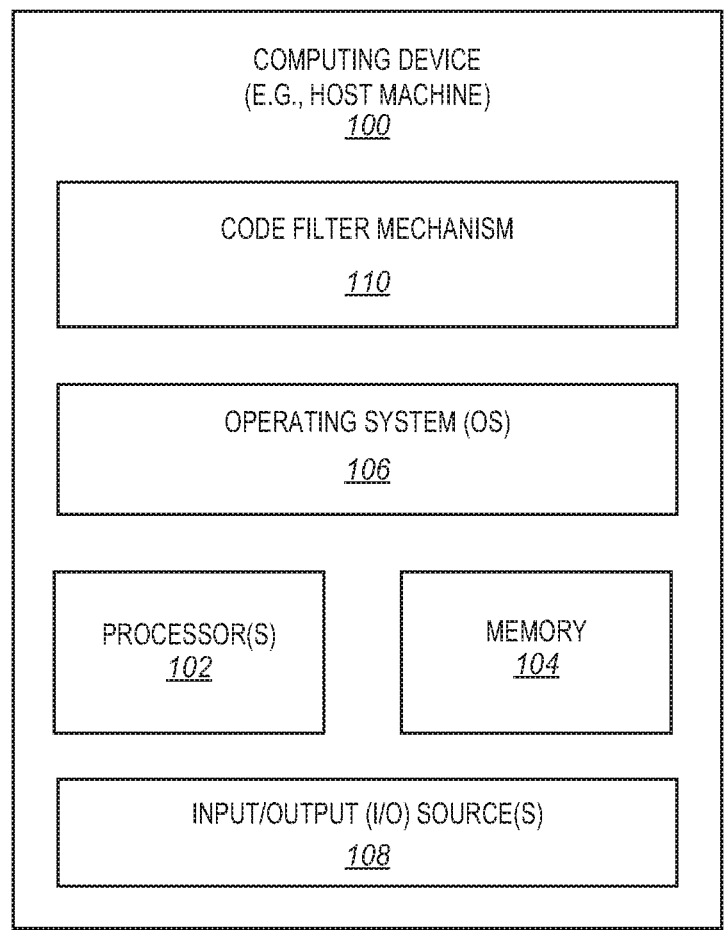
FIG. 1 illustrates a computing device employing a code filter mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel code filter to improve the quality of code image using a relatively simple set of rules that valid codes are capable of satisfying. In one embodiment, the code filter includes a set of filters having a sequence of a vertical filter, a horizontal filter (whose role may be to smooth code transitions along vertical and horizontal directions applied one after another in sequence, where the combination of vertical and horizontal filters serve as an efficient way of performing two-dimensional (2D) filtering) and a consistency filter (whose role may be to analyze runs of constant code values in rows and interpolate the code values if the run is between two code transitions as well as to mark invalid code pixels).

In one embodiment, the novel code filter allows for producing code images that have consistent structure, which is in contrast to simply applying standard/conventional smoothing filters to the code image that results in even greater and stronger artifacts than improving the depth quality.

It is contemplated that "noise", throughout the document, interchangeably refers to "image noise" which is regarded as an undesirable by-product of image capture that is known for adding information or data that may be regarded as bogus, unauthenticated, illegitimate, unwanted, spurious, irrelevant, superfluous, and/or the like. The noise may be a form of electronic noise along with being a random variation of brightness or color information in digital images, where the noise may originate from any number and type of sources, such as film grain, etc., or be generated or caused by one or more input/out components of computing devices, such as one or more of digital depth-sensing cameras, sensors, detectors, scanners, etc. For example, noise refers to image noise that includes one or more of quantization noise, Gaussian noise, salt-and-pepper noise, short noise, anisotropic noise, and film grain.

In one embodiment, image receiving or capturing, depth measuring, etc., may be performed by one or more components of image capturing/depth sensing systems, such as depth sensors, depth-sensing cameras (e.g., Intel® RealSense™, etc.), ranging cameras, time-of-flight (ToF) cameras, etc.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to digital images, depth sensing, creating and executing filters, tracking, progressing, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 2:
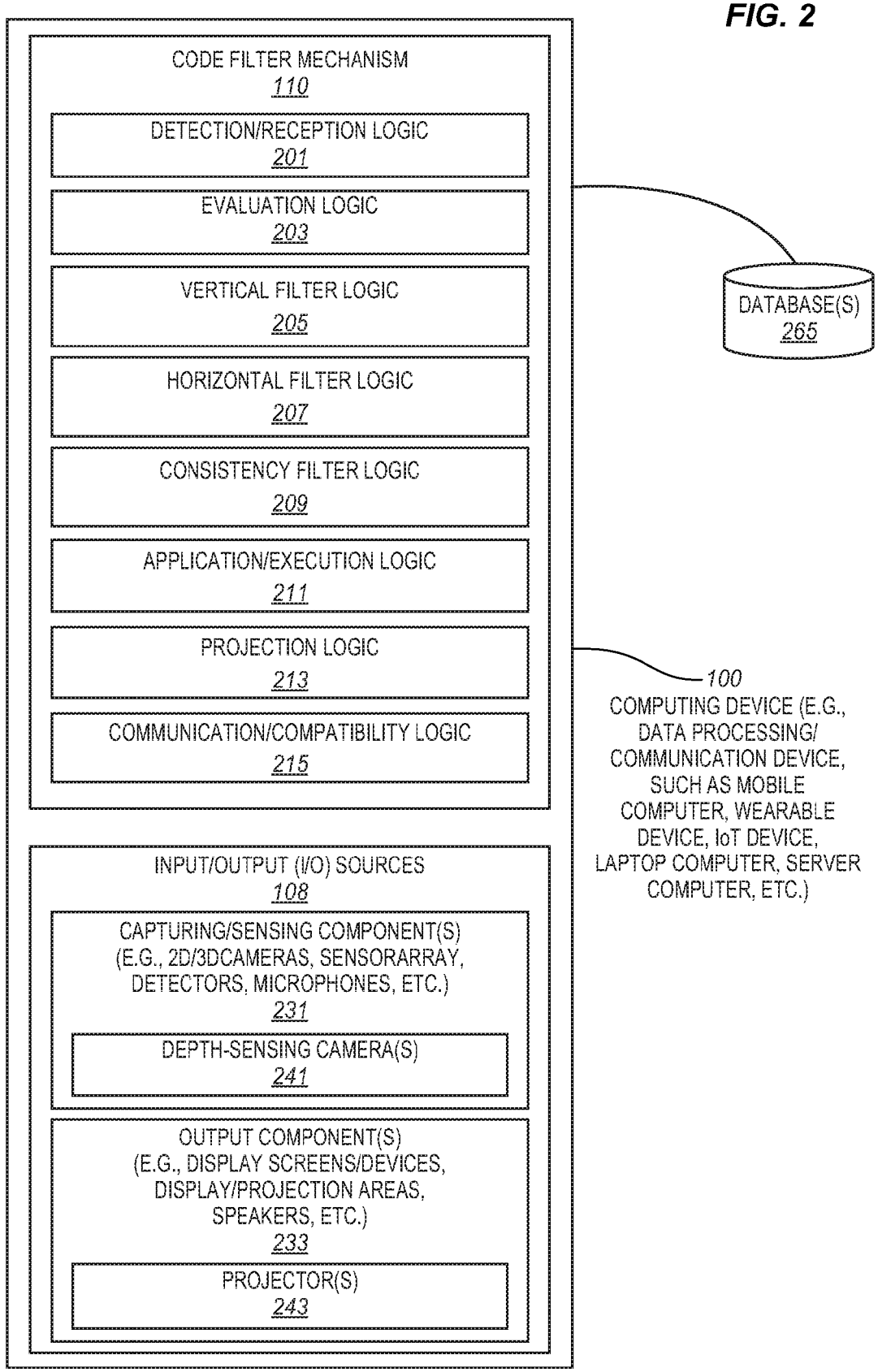
FIG. 2 illustrates a code filter mechanism according to one embodiment.

FIG. 1 illustrates a computing device 100 employing a code filter mechanism 110 according to one embodiment. Computing device 100 servers a host machine for code filter mechanism 110 that may include any number and type of components, as illustrated in FIG. 2. to facilitate intelligent and dynamic reduction in unwanted noise (e.g., undesirable information, etc.) in digital images that are captured or received using one or more of depth sensors, depth-sensing cameras (e.g., Intel® RealSense™, etc.), ranging cameras, time-of-flight (ToF) cameras, etc., to enhance user experience by offering clearer images, as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, smart windshields, smart windows, head-mounted displays (HMDs) (e.g., optical head-mounted display (e.g., wearable glasses, head-mounted binoculars, gaming displays, military headwear, etc.), and other wearable devices (e.g., smart watches, bracelets, smartcards, jewelry, clothing items, etc.), etc.

It is contemplated and to be noted that embodiments are not limited to computing device 100 and that embodiments may be applied to and used with any form or type glass that is used for viewing purposes, such as smart windshields, smart windows, and/or the like. Similarly, it is contemplated and to be noted that embodiments are not limited to any particular type of computing device and that embodiments may be applied and used with any number and type of computing devices; however, throughout this document, the focus of the discussion may remain on wearable devices, such as wearable glasses, etc., which are used as examples for brevity, clarity, and ease of understanding.

In some embodiments, computing device 100 may include a large(r) computing system (e.g., server computer, desktop computer, laptop computer, etc.), such that a flexible display screen may be part of this large(r) computing system where the flexible display screen may be a part or an extension screen of a main display screen, where the main screen itself may be flexible or static.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as one or more touchable and/or non-touchable flexible display screen(s) (e.g., foldable screens, roll-able screens, bendable screens, curve-able screens, etc.), touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

FIG. 2 illustrates a code filter mechanism 110 according to one embodiment. In one embodiment, code filter mechanism 110 may include any number and type of components, such as (without limitation): detection/reception logic 201; evaluation logic 203; vertical filter logic 205; horizontal filter logic 207; consistency filter logic 209; application/execution logic 211; projection logic 213; and communication/compatibility logic 215.

Computing device 100 is further shown as hosting input/output source(s) 108 having capturing/sensing components 231 including depth camera(s) 241, sensors, detectors, microphones, etc., and output sources 233 including one or more projector(s) 243, display devices, speakers, etc.

In one embodiment, code filter mechanism 110 may be hosted by computing device 100, such as a communication/data-processing device including a mobile computer (e.g., smartphone, tablet computer, etc.), wearable computers (e.g., wearable glasses, smart bracelets, smartcards, smart watches, HMDs, etc.), Internet of Things (IoT) devices, and/or the like. In another embodiment, computing device 100 may be a larger communication machine, such as a server computer, a desktop computer, a laptop computer, etc. In one embodiment, computing device 100 may be in communication with one or more other computing devices (also referred to as "personal devices"), such as mobile computers, wearable devices, etc., over communication medium, such as one or more networks (e.g., cloud network, the Internet, proximity network, such as Bluetooth, etc.).

For example and in one embodiment, computing device 100 may serve as a server computer hosting code filter mechanism 110 in its entirety while communicating one or more services offered by code filter mechanism 110 with one or more other devices, such as client/personal devices, over communication medium, such as a cloud network. In another embodiment, computing device 100 itself may be another personal device having code filter mechanism 110, either partially or entirely, as part or in support of a software application, such as software application (also referred to as "application" or "client-based application") including a noise reduction (NR) application or a non-NR application or any other type of software application, such as a web browser, which may be downloadable or accessible over one more networks, such as a cloud network, a proximity network, the Internet.

I/O source(s) 108 include capturing/sensing component(s) 231 and output component(s) 233 which, as will be further described below, may also include any number and type of components, sensor arrays, detectors, displays, etc. For example, capturing/sensing components 231 may include (without limitation) depth-sensing camera(s) (e.g., Intel® RealSense™ camera, etc.), two-dimensional (2D) cameras, three-dimensional (3D) cameras, sensor arrays (such as context/context-aware sensors and environmental sensors, such as camera sensors, ambient light sensors, Red Green Blue (RGB) sensors, movement sensors, etc.), image sources, audio/video/signal detectors, microphones, eye/gaze-tracking systems, head-tracking systems, etc.), etc., while, output components 233 may include (without limitation) projector(s) 243, display/projection areas, audio/video/signal sources, display planes, display panels, display screens/devices, projectors, display/projection areas, speakers, etc.

Computing device 100 may be further in communication with one or more repositories or data sources or databases, such as database(s) 265, to obtain, communicate, store, and maintain any amount and type of data (e.g., convolution data, deconvolution data, transition stripes data, shaping data, pre-shaping data, captured digital images, projection data, recommendations, predictions, data tables, data maps, media, metadata, templates, real-time data, historical contents, user and/or device identification tags and other information, resources, policies, criteria, rules, regulations, upgrades, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

In one embodiment, a projector, such as projector 243 (e.g., microelectromechanical systems (MEMS) projector using in Intel® RealSense®), projects patterns of binary code (e.g., vertical stripes) that are reflected from an object and captured by a camera, such as camera 241. Similarly, projector 243 may also be responsible for projected any image noise that is not eliminated or reduced from its corresponding digital image. For example, when using camera 241 (e.g., Intel® RealSense™ coded-light 3D camera), a scene may be illuminated by a sequence of binary code patterns (e.g., vertical stripes, such as black and white stripes) that are captured by camera 241, where each pixel as seen by camera 241 may have a code allowing to infer the depth of the scene by, for example, triangulation from the known relative positions of camera 241 and projector 243.

In one embodiment, a digital image of an object may be captured by camera 241, where the image may then be detected by or received at detection/reception logic 201. It is contemplated that this image may include a number and type of distortions, such as image noises representing information/data that may regarded as unwanted, unessential, unnecessary, etc. In one embodiment, these image noises may be detected by detection/reception logic 201. Upon detection of noise in the captured image by detection/reception logic 201, evaluation logic 203 may be triggered to evaluate the noise and any other relevant data to determine whether the noise needs to be smoothed out and what type of filter is to be selected to accomplish the task, such as vertical filter, horizontal filter, and consistency filter, etc.

It is contemplated that each pixel in a scene of a digital image may contain code value (which may be obtained from interpreting the binary code relating to the digital image) and a jump value (which indicates whether the code estimation in the pixel is confident, and whether a code transition has been detected in a particular pixel, where a sub-pixel location may be provided in the later case), as illustrated with reference to FIG. 3A. In one embodiment, any one or more of a vertical filter, a horizontal filter, and a consistency filter may be applied.

Figure 3A:
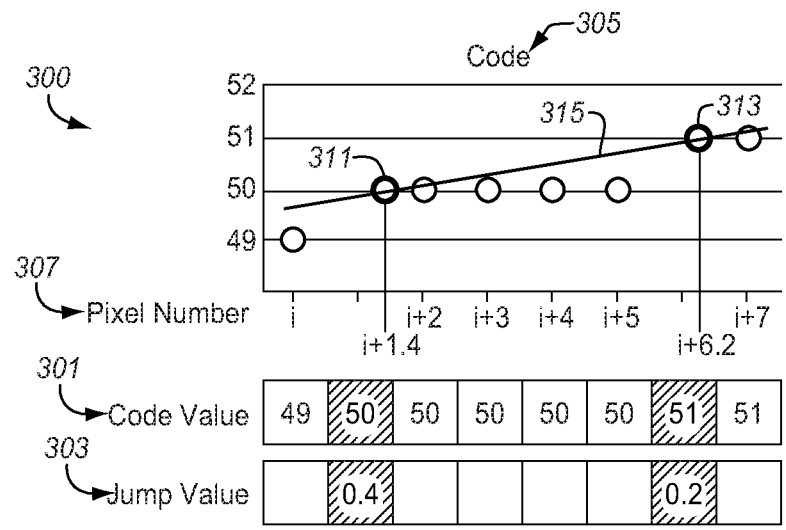
FIG. 3A illustrates a representation of a code image according to one embodiment.
Figure 3B:
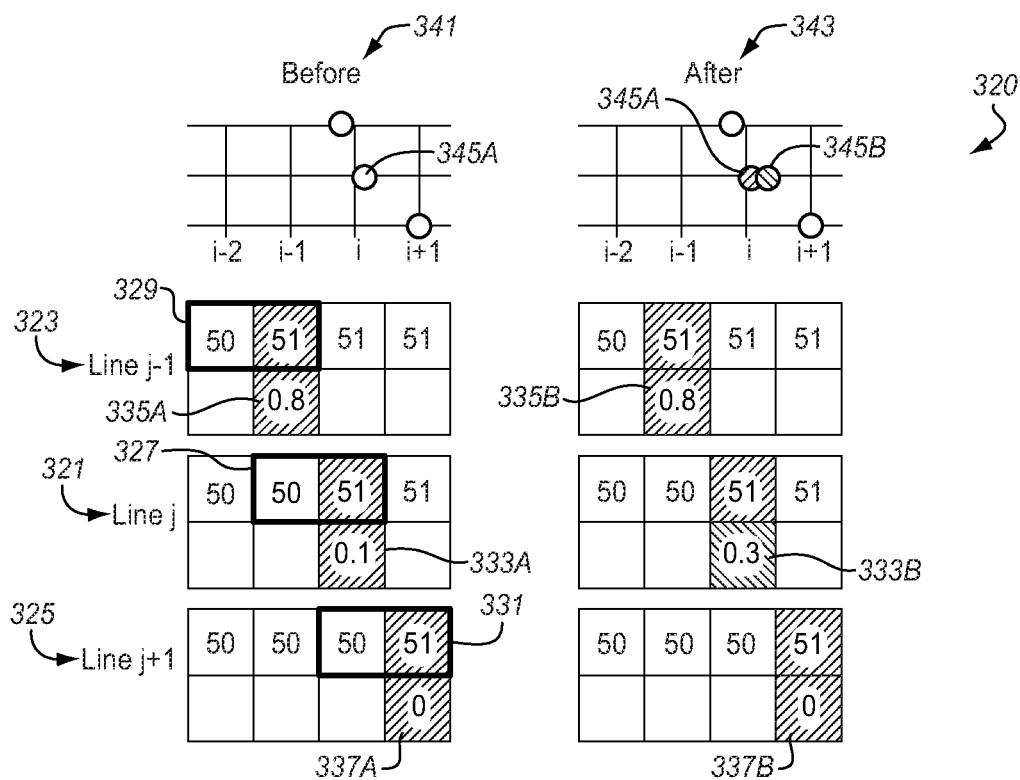
FIG. 3B illustrates vertical filter computation according to one embodiment.

In one embodiment, as illustrated and further discussed with regard to FIG. 3B, vertical filter logic 205 may be triggered to compute a vertical filter to straighten vertical code transitions by refining sub-pixel jump locations from corresponding jumps in vertical neighbors. For example, in some embodiments, in a sliding window, three subsequent lines may be lie on a line to be considered for vertical filtering.

Figure 3C:
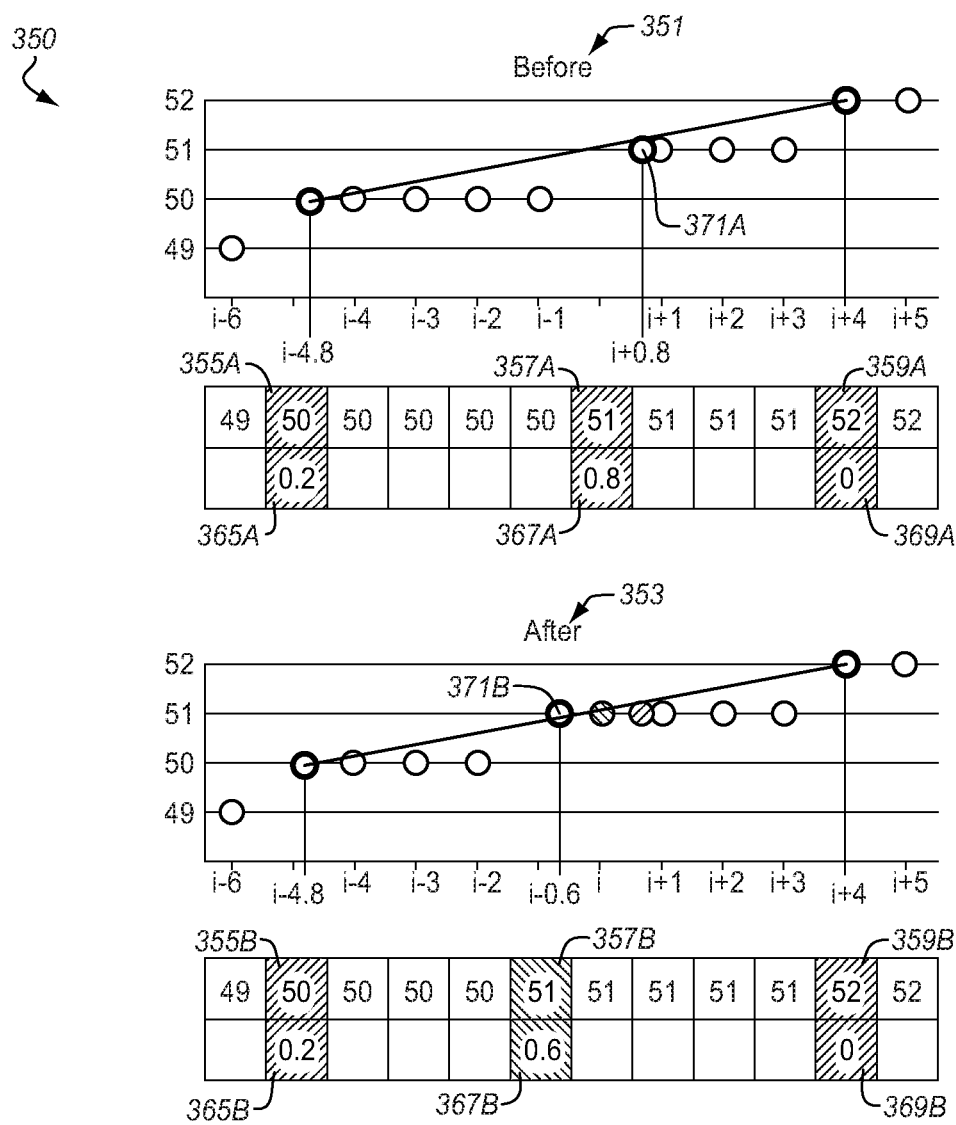
FIG. 3C illustrates horizontal filter computation according to one embodiment.

In one embodiment, as illustrated and further discussed with regard to FIG. 3C, horizontal filter logic 207 may then be triggered to compute a horizontal filter to be applied to vertical code transitions by refining a sub-pixel transition from two horizontal neighbors, where, for example, horizontal spaces between subsequent transitions may be equal. In one embodiment, the horizontal and vertical filters may be applied multiple times in a sequence, serving effectively as a 2D code filter with large support.

Figure 3D:
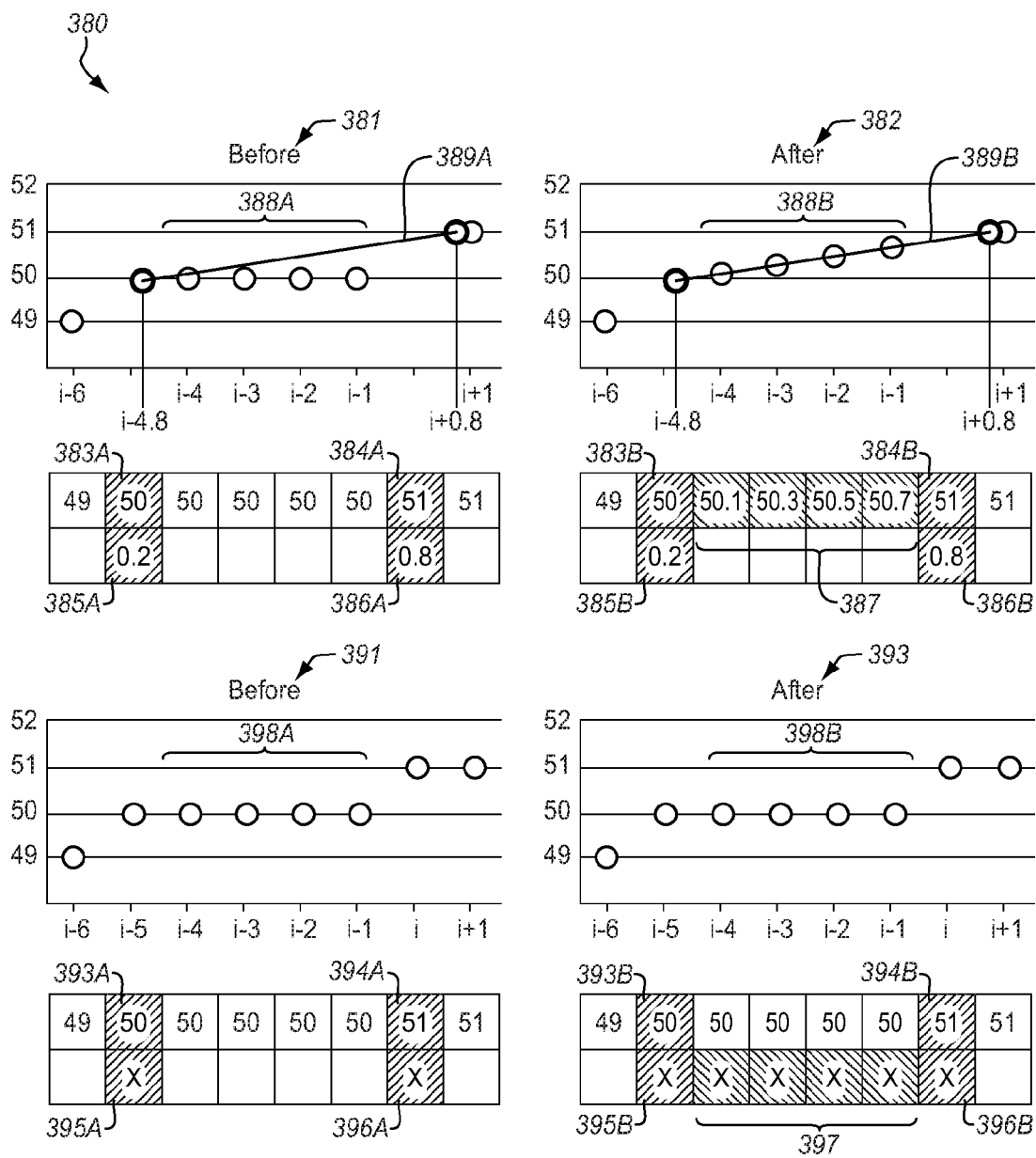
FIG. 3D illustrates consistency filter computation according to one embodiment.

Further, in one embodiment, as illustrated and further discussed with regard to FIG. 3D, consistency filter logic 209 may then be triggered to compute a consistency filter to improve the accuracy of any code interpolating code values between two valid jumps and also invalidating pixels between two invalid code transitions (which are likely to result from motion artifacts). For example, when applied, the output of the consistency filter may provide for a higher precision code.

In one embodiment, application/execution logic 211 may then be used to execute one or more of the vertical filter, the horizontal filter, and the consistency filter to initiate the process and obtain its intended benefits, such as producing code images having a consistent structure. In one embodiment, once the quality of the code image has been improved and accordingly, the depth quality of the digital image has been improved, the resulting image may be verified and projected by projector 243 and as facilitated by projection logic 213. For example, during use, projector 243 may be configured by projection logic 213 to project the digital image without or smoothed out noise, leaving a sharper and uncorrupted image.

Communication/compatibility logic 215 may be used to facilitate dynamic communication and compatibility between computing device 100, database(s) 265, communication medium, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "image", "digital image", "depth-sensing camera", "capture", "receive", "project", "projector", "object", "noise", "image noise", "filter", "vertical filter", "horizontal filter", "consistency filter", "code filter", "code image", "sharpness", "noise reduction", "noise elimination", "noise management", "user", "user profile", "user preference", "user", "sender", "receiver", "personal device", "smart device", "mobile computer", "wearable device", etc., should not be read to limit embodiments to software or devices that carry that label in products or in literature external to this document.

It is contemplated that any number and type of components may be added to and/or removed from code filter mechanism 110 to facilitate various embodiments including adding, removing, and/or enhancing certain features. For brevity, clarity, and ease of understanding of code filter mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

For brevity, many of the details discussed with reference to the previous figures may not be discussed or repeated hereafter.

FIG. 3A illustrates a hypothetical ideal continuous code 315 of one line of a code image, and its digital representation 300 according to one embodiment. In one embodiment, each pixel at position i contains code value 301 denoted by $c_i$ and jump value 303 denoted by $\Delta_i$ (that is used to encode the confidence of the corresponding code value as well as the presence of a code transition in this pixel, where, in the latter case, the sub-pixel location may be provided). In one embodiment, the encoding of the sub-pixel code transition is represented as a positive offset $\Delta_i$ from the integer pixel location i quantized to $\frac{1}{10}$ of a pixel, and encompasses values from 0 (meaning that the code transition occurred exactly at the integer pixel location i) to 0.9 (meaning the code transition occurred at i+0.9) in increments of 0.1.

The x-axis in FIG. 3A represents integer pixel locations 307 and y-axis represents code values 305. Shown are two code transitions marked in shading: from value 49 to value 50 and from value 50 to value 51. The first transition 311 occurs at position i+1.4; this is encoded by specifying jump value of $\Delta_{i+1}=0.4$ at position i+1; the code value in this position is $c_{i+1}=50$. Therefore, representation 300 may be interpreted as follows: transition from code value $c_i=49$ to $c_{i+1}=50$ occurs at position $i+1\Delta_{i+1}$ (marked in bold circle), such as 311 and 313, forming straight line 315.

FIG. 3B illustrates vertical filter computation 320 according to one embodiment. For brevity, many of the details discussed with reference to the previous figures may not be discussed or repeated hereafter. As aforementioned, a vertical filter may be computed and applied to straighten any vertical code transitions by refining sub-pixel jump locations from corresponding jumps in vertical neighbors.

In one embodiment, the vertical code filter operates as a sliding window, extracting a patch of pixels containing code value and corresponding jump values. In the example shown, the window is of size 3×4. The figure shows three lines of code (numbered as j−1 323, j 321, and j+1 325) and corresponding jump values 335A, 333A, and 337A.

In the illustrated embodiment, a vertical code filter is computed and applied for refinement of sub-pixel position 333A of code transition 327 from value 50 to value 51 in line j and column i (center of the window) with sub-pixel offset $\Delta_{j,i}=0.1$. The vertical code filter detects code transition 327 in line j and finds identical code transitions in line above (j−1) 329 and line below (j+1) 331. In the illustrated example, the code transitions in line j−1 329 and in line j+1 331 are detected at positions $i-1+\Delta_{j-1,i-1}=i-1+0.8=i-0.2$ and $i+1+\Delta_{j+1,i+1}=i=1=0=i+1$, respectively; the corresponding jump values are $335A+\Delta_{j-1,i-1}=0.8$ and $337A\ \Delta_{j+1,i+1}=0$.

The vertical code filter uses the sub-pixel locations 335A, 333A, 337A of code transitions 329, 327, 331 in all the three lines 323, 321, 325 to straighten the code transitions such that they lie along a line, in before graph 341, where, in after graph 343, they are correspondingly shown as 335B, 333B, and 337B. For this purpose, the sub-pixel location of the code transition in line j is updated to the average of all the three sub-pixel code transition locations 335A, 333A, 337A: $(i-1+\Delta_{j-1,i-1}+i+\Delta_{j,i}+i+1+\Delta_{j+1,i+1})/3=i+(-0.2+0.1+1)/3=i+0.3$; thus, in after graph 343, new location 345B of code transition 327 in line j replacing old location 345A is i+0.3, which is encoded by new jump value 333B $\overline{\Delta}_{j,i}=0.3$, where jump values 335A, 337A in lines j−1 and j+1 are left intact. As shown, old location 345A is shown in before graph 341 and correspondingly in after graph 343.

In one embodiment, the new jump value is rounded to the closest increment of 0.1. In case of a negative jump value, the jump is moved to the previous pixel as illustrated in FIG. 4C as operation 480; similarly, in case of an jump value bigger or equal to 1, the jump is moved to the next pixel.

Referring now to FIG. 4C illustrates operation 480 of vertical filter in which a jump is moved to the previous pixel. In the illustrated example, the code transition from value 50 to 51, as shown in block 483A, is found in line j at position i+j,i=i+0.1, in line j−1 at position i−1+j−1,i−1=i−1+0.1=i−0.9, and in line j+1 at position i−1+j+1,i−1=i−1+0.1=i−0.9 as illustrated at positions 487, 485, and 489, respectively, in block 481A. Averaging of these sub-pixel positions yields a new jump value −0.6, which is a negative and thus the jump is moved one pixel to the left and equivalently encoded by the jump code i,i−1=−0.2 (since i−1+0.2=i−0.8) at position 491 in block 481B, where the value of the code in pixel i−1 is updated to $ci_{-1}=51$ at position 493 in block 483B in the illustrated output.

Accordingly, Applicants respectfully request the withdrawal of this objection to the Specification.

Referring now to FIG. 3C, it illustrates horizontal filter computation 350 according to one embodiment. For brevity, many of the details discussed with reference to the previous figures may not be discussed or repeated hereafter. As aforementioned, a horizontal filter may be computed and applied to improve a sequence of code transitions occurring in one line.

In one embodiment, the horizontal filter operates as a sliding window, extracting a patch of pixels containing code value and corresponding jump values. In the example shown, for brevity and clarity, the window size is 1×12, where code values 355A, 357A and 359A and jump values 365A, 367A and 369A are shown in before graph 351, while code values 355B, 357B, 359B and jump values 365B, 367B, 369B are shown in after graph 353.

In the illustrated embodiment, a horizontal filter detects code transition 357A (from value 50 to 51) in the center of the window, at pixel position i with offset 367A $\Delta_i=0.8$, such as 371A. The horizontal filter locates previous code transition 355A (from value 49 to 50) at position $i-5+\Delta_{i-5}=i-5+0.2=i-4.8$ and next code transition 359A (from value 51 to 52) at position $i+4+\Delta_{i+4}=i+4+0=i+4$ in one line of code.

The horizontal filter attempts to make the code transition positions equi-spaced, such that the distance between the previous and the current transition is equal to the distance between the current and next transition; this way, the three transitions (illustrated with bold circles) may lie along a hypothetical line.

For this purpose, the horizontal filter adjusts the jump value 367A $\Delta_i$ of the current transition 357A, such that the following equality holds:

$$(i+x)-(i-5+\Delta_{i-5})=(i+4+\Delta_{i+4})-(i+x)$$

$$(i+x)=(i+4+i-4.8)/2=i-0.4,$$

where x is the new jump value, from where it follows that the new jump value is $\overline{\Delta}_i=-0.4$. Since in the illustrated case the new jump value is negative, the jump has to be moved to the previous pixel i−1, with an equivalent encoding $\overline{\Delta}_{i-1}=0.6$ (since i−1+0.6=i−0.4), such as 371B. The code values are updated accordingly (moved one pixel to the left): the value of the code in pixel i−1 is updated to $c_{i-1}$32 51.

As previously mentioned, the horizontal and vertical filter may be applied multiple times in a sequence to effectively serve as a 2D code filter with a large support.

FIG. 3D illustrates consistency filter computation 380 according to one embodiment. For brevity, many of the details discussed with reference to the previous figures may not be discussed or repeated hereafter. As aforementioned, the consistency filter improves the accuracy of the code interpolating code values between two valid code transitions, and also invalidates pixels between two invalid code transitions (which are likely to result from motion artifacts). The output of the filter is code in higher precision, possibly containing non-integer values. Further, in case of a single valid jump, the consistency filter may use extrapolation.

FIG. 3D illustrates two cases. In the first case, the input (before graph) 381, contains two valid code transitions (383A from 49 to 50 at sub-pixel position $i-5+\Delta_{i-5}=i-5+0.232$ i−4.8 and 384A from 50 to 51 at sub-pixel position $i+\Delta_i=i+0.8=i+0.8$). The two code transitions can be illustrated as end points (marked in bold circles) of a line segment 389A (and a corresponding line segment 389B). The occurrences 388A of code value 50 lying in positions i−4, i−3, i−2, i−1 between the two transitions are a zero-order hold approximation of linear segment 389A.

The consistency filter improves the accuracy of the code values 388A to lie on the line segment 389A, resulting in new code values 388B in the output (after graph) 382, including other corresponding output values, such as code values 383B, 384B and jump values 385B, 386B corresponding to code values 383A, 384A and jump values 385A, 386A, where code values 387 represents code values in-between 383B and 384B. For this purpose, the code values are updates as follows: let $i_1$, $i_2$ denote the transition positions (in the illustrated case, $i_1=i-4.8$ and $i_2=i+0.8$), $c_1$, $c_2$ denote the code values at these positions (in the illustrated case, $c_1=50$ and $c_2=51$) and let k be a position between $i_1$ and $i_2$. Then, the code value $c_k$ at position k is computed by linear interpolation ($i_1 <= k <= i_2$):

$$c_k = c_1 + (c_2 - c_1)\frac{k-i_1}{i_2-i_1} = 50 + \frac{k-i+4.8}{i+0.8-i+4.8} = 50 + \frac{k-i+4.8}{5.6},$$

from which it follows that the new code values 388B in the output 382 are:

$$c_{i-4} = 50 + \frac{i-4-i+4.8}{5.6} = 50 + \frac{0.8}{5.6} = 50.1,$$

$$c_{i-3} = 50 + \frac{1.8}{5.6} = 50.3,$$

$$c_{i-2} = 50 + \frac{2.8}{5.6} = 50.5,$$

$$c_{i-1} = 50 + \frac{3.8}{5.6} = 50.7.$$

In the second illustrated case, the input (before graph) 391 contains two invalid code transitions 395A and 396A (indicated by X in the corresponding jump values) corresponding to code values 393A and 394A, respectively. In this case, in one embodiment, the consistency filter invalidates the whole run of pixels 398A contained between the two transitions 395A and 396A, by setting the corresponding jump codes 397 to an invalid value, such as X, situated between other invalid jump values 395B and 396B corresponding to code values 393B and 394B, respectively, represented as pixels 398B in output (after graph 393).

Two additional cases (not illustrated) are when one of the transitions is valid and another is invalid. In this case, an additional transition would be found, and the code values computed using extrapolation. In the case when the first transition $i_1$ is valid and the second transition $i_2$ is invalid, another valid transition $i_0$ to the left of $i_1$ will be found. The code values at position $k > i_1$ will be computed from code values $c_0$ and $c_1$ by linear extrapolation:

$$c_k = c_0 + (c_1 - c_0)\frac{k-i_0}{i_1-i_0}.$$

Similarly, in the case when the second transition $i_2$ is valid and the first transition $i_1$ is invalid, another valid transition $i_3$ to the right of $i_2$ will be found. The code values at position $k < i_2$ will be computed from code values $c_1$ and $c_2$ by linear extrapolation:

$$c_k = c_2 + (c_3 - c_2)\frac{k-i_2}{i_3-i_2}.$$

FIG. 4A illustrates a transaction sequence 400 for computing and applying a code vertical filter according to one embodiment. Transaction sequence 400 may be performed by processing logic that may comprise hardware (e.g., circuitry, dedicated logic, programmable logic, etc.), software (such as instructions run on a processing device), or a combination thereof, as facilitated by code filter mechanism 110 of FIG. 1. The processes of transaction sequence 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

As previously discussed with reference to FIG. 3B, transaction sequence 400 for computing and applying a vertical filter begins with jump image 401 and code image 403, where jump block 411 and code block 413 of jump image 401 and code image 403, respectively, using a sliding window technique, such as based on sliding window 405. Upon obtaining jump and code blocks 411, 413, at process 415, a determination is made as to whether there is a code transition in a block center. If not, at process 417, nothing more is performed; however, if yes, at process 419, code transitions are detected in the line above and the line below.

In the illustrated example, the center of the block contains code transition from value 50 to 51 at position in line j and column i+0.1. Same code transitions are detected in lines j−1 and j+1 at positions denoted by $i^-=i-1+0.8=i-0.2$ and $i^+=i+1+0=i+1$.

At process 421, another determination is made as to whether transitions are found. If not, at process 423, nothing more is performed; however, if yes, at process 425, another determination is made as to whether all transitions are valid (in the illustrated example, all the transitions are valid). If not, at process 427, nothing more is performed; however, if yes, at process 429, a new jump value is computed by averaging the sub-pixel positions of the transitions in lines j−1, j, and j+1:

$$\overline{\Delta}_{ji} = \frac{i + \Delta_{j,i} + i^+ + \Delta_{j+1,i^+} + i^- + \Delta_{j-1,i^-}}{3} - i.$$

The value $\overline{\Delta}_{ji}$ can also be rounded to the closest increment of 0.1 according to one embodiment.

If the new jump value $\overline{\Delta}_{ji}$ is within the range 0 . . . 0.9, process 433 of updating the current jump value with the new one is performed. Only the jump value in pixel j,i is affected.

If the new jump value $\overline{\Delta}_{ji} < 0$, process 431 of moving the jump location to one pixel to the left is performed. For this purpose, the current jump code is set to zero, $\Delta_{ji}=0$, and the jump code in the pixel to the left is set to $\Delta_{j,i-1}=1+\overline{\Delta}_{ji}$, resulting in an equivalent encoding of the transition location (since $i-1+(1+\overline{\Delta}_{ji})=i+\overline{\Delta}_{ji}$). The code values are also updated by moving the transition to the left.

If the new jump value $\overline{\Delta}_{ji} > 0$, process 435 of moving the jump location to one pixel to the right is performed in a similar way. For this purpose, the current jump code is set to zero, $\overline{\Delta}_{ji}=0$, and the jump code in the pixel to the right is set to $\Delta_{j,i+1}=\overline{\Delta}_{ji}-1$, resulting in an equivalent encoding of the transition location (since $i+1+(\overline{\Delta}_{ji}-1)=i+\overline{\Delta}_{ji}$). The code values are also updated by moving the transition to the right.

Figure 4B:
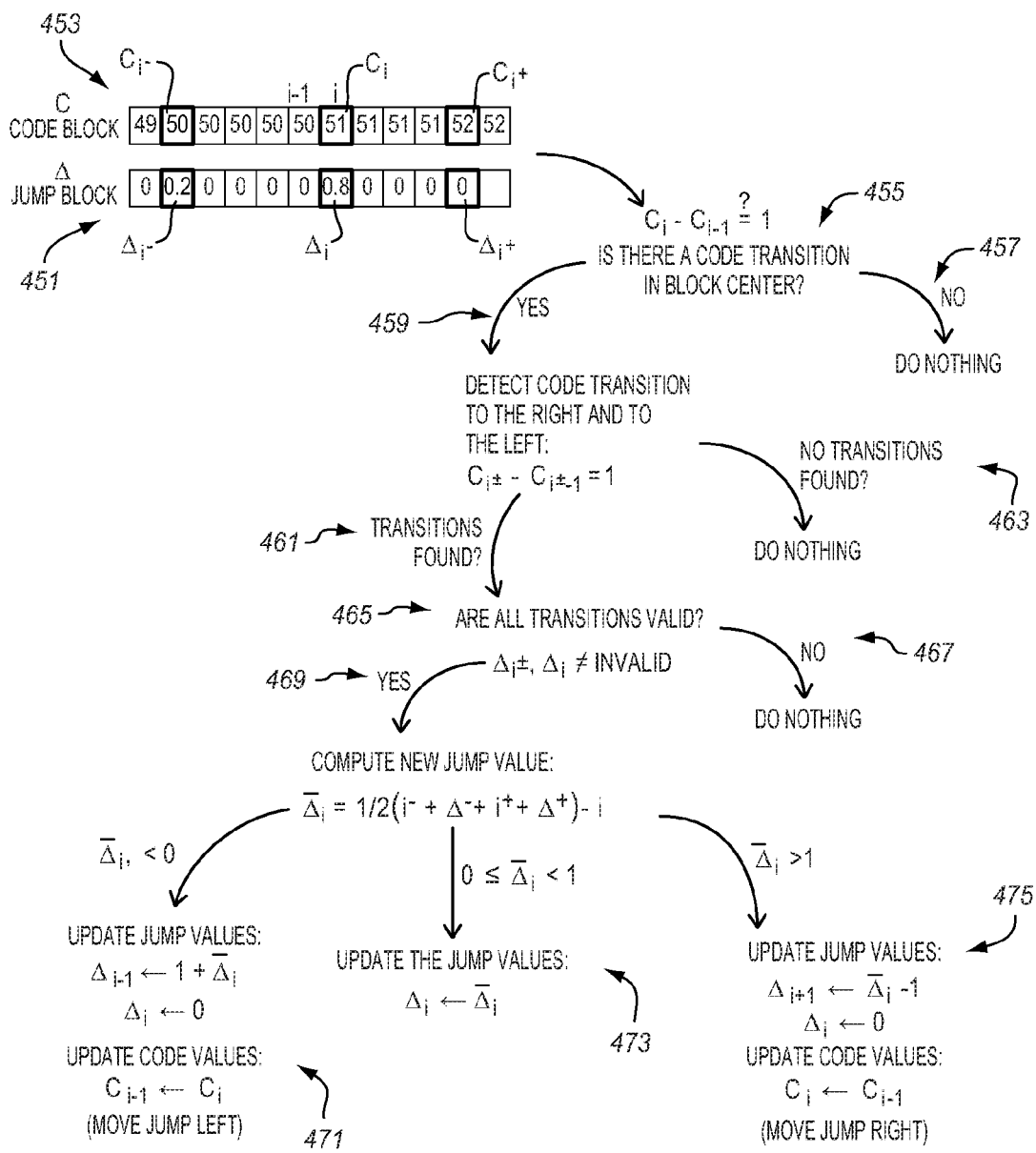
FIG. 4B illustrates a transaction sequence for computing and applying a code horizontal filter according to one embodiment.

FIG. 4B illustrates a transaction sequence 440 for computing and applying a code horizontal filter according to one embodiment. Transaction sequence 440 may be performed by processing logic that may comprise hardware (e.g., circuitry, dedicated logic, programmable logic, etc.), software (such as instructions run on a processing device), or a combination thereof, as facilitated by code filter mechanism 110 of FIG. 1. The processes of transaction sequence 440 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

As previously discussed with reference to FIG. 3C, transaction sequence 440 for computing and applying a horizontal filter begins with jump image 441 and code image 443, where jump block 451 and code block 453 of jump image 441 and code image 443, respectively, using a sliding window technique, such as based on sliding window 445. Upon obtaining jump and code blocks 451, 453, at process 455, a determination is made as to whether there is a code transition in a block center. If not, at process 457, nothing more is performed; however, if yes, at process 459, code transitions are detected to the right and the left.

In the illustrated example, code transitions are detected at positions i+0.8, i$^-$=i−5+0.2=i−4.8, and i$^+$=i+4+0=i+4. At process 461, another determination is made as to whether transitions are found. If not, at process 463, nothing more is performed; however, if yes, at process 465, another determination is made as to whether all transitions are valid (in the illustrated example, all the transitions are valid). If not, at process 467, nothing more is performed; however, if yes, at process 469, a new jump value is computed to ensure that the code transitions are equi-distant:

$$(i^+ + \Delta_{i^+}) - (i + \overline{\Delta}_i) = (i + \overline{\Delta}_i) - (i^- + \Delta_{i^-}),$$

resulting in $$\overline{\Delta}_i = \frac{i^+ + \Delta_{i^+} + i^- + \Delta_{i^-}}{2} - i.$$

The value $\overline{\Delta}_i$ can also be rounded to the closest increment of 0.1 according to one embodiment. If the new jump value $\overline{\Delta}_i$ is within the range 0 . . . 0.9, the process 473 of updating the current jump value with the new one is performed. Only the jump value in pixel i is affected.

If the new jump value $\overline{\Delta}_i$<0, the process 471 of moving the jump location to one pixel to the left is performed. For this purpose, the current jump code is set to zero, $\Delta_i$=0, and the jump code in the pixel to the left is set to $\Delta_{i-1}$=1+$\overline{\Delta}_i$, resulting in an equivalent encoding of the transition location (since i−1+(1+$\overline{\Delta}_i$)=i+$\overline{\Delta}_i$). The code values are also updated by moving the transition to the left.

If the new jump value $\overline{\Delta}_i$>0, the process 475 of moving the jump location to one pixel to the right is performed in a similar way. For this purpose, the current jump code is set to zero, $\Delta_i$=0, and the jump code in the pixel to the right is set to $\Delta_{i+1}$=$\overline{\Delta}_i$−1, resulting in an equivalent encoding of the transition location (since i+1+($\overline{\Delta}_i$−1)=i+$\overline{\Delta}_i$). The code values are also updated by moving the transition to the right.

Figure 7:
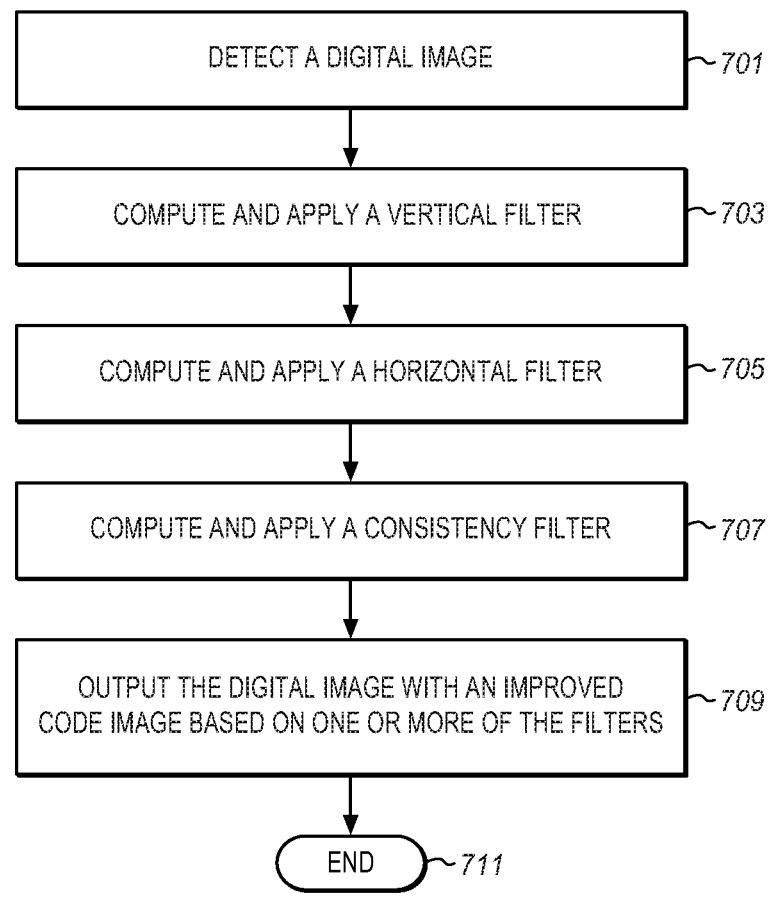
FIG. 7 illustrates a method for computing and applying one or more of a vertical filter, a horizontal filter, and a consistency filter according to one embodiment.

Referring now to FIG. 7, it illustrates a method 700 for computing and applying one or more of a vertical filter, a horizontal filter, and a consistency filter according to one embodiment. Method 700 may be performed by processing logic that may comprise hardware (e.g., circuitry, dedicated logic, programmable logic, etc.), software (such as instructions run on a processing device), or a combination thereof, as facilitated by code filter mechanism 110 of FIG. 1. The processes of method 700 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 700 begins at block 701 with detection of a digital image, where the digital image is capture using one or more capturing/sensing components, such as one or more depth-sensing cameras (e.g., Intel® RealSense™ cameras, etc.). It is contemplated that the digital image includes an image of a 3D object, where the digital image may include contaminated pixels causing depth edge noise, such as lack of or reduced sharpness in the digital image. It is contemplated that other forms of image noise may include (without limitation) depth quantization noise, saw-tooth noise, Gaussian noise, Poisson noise, salt-and-pepper noise, short noise, anisotropic noise, film grain, and/or the like.

In one embodiment, at block 703, a vertical filter is computed and applied to straighten vertical code transitions by refining sub-pixel jump locations from corresponding jumps in vertical neighbors. Similarly, at block 705, a horizontal filter is computed and applied to straighten horizontal code transitions by refining sub-pixel transitions from multiple horizontal neighbors. Subsequently, at block 707, a consistency filter is computed and applied to improve the accuracy of the interpolating code values between two valid jumps, while invalidating pixels between two invalid code transitions (that are likely to result from motion artifacts). At block 709, the digital image is outputted, wherein the digital image now has an improved code image based on the application of one or more of the vertical filter, the horizontal filter, and the consistency filter. Method 700 ends at block 711.

Figure 5:
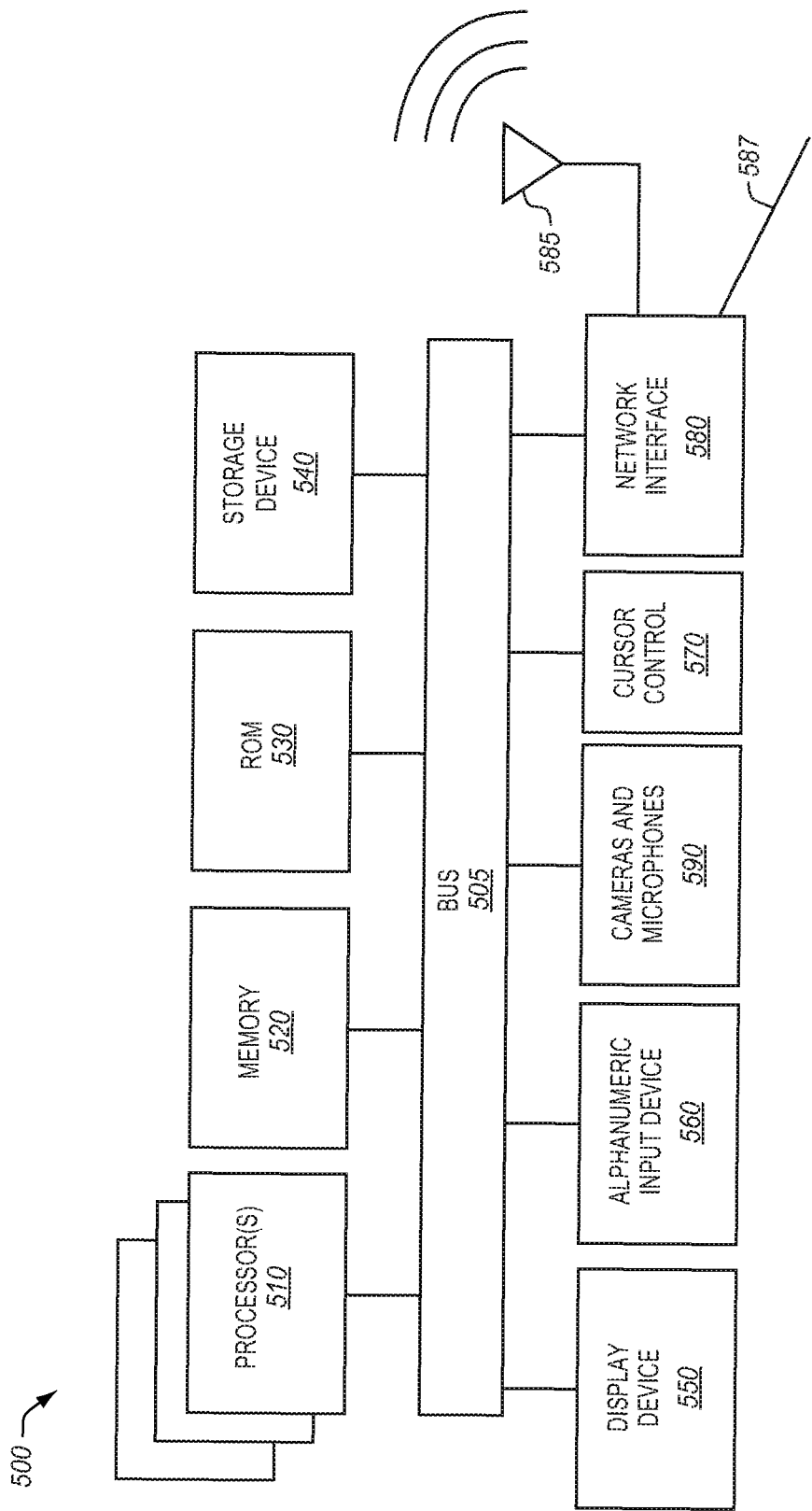
FIG. 5 illustrates computer system suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Data storage device 540 may be coupled to bus 505 to store information and instructions. Data storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

Figure 6:
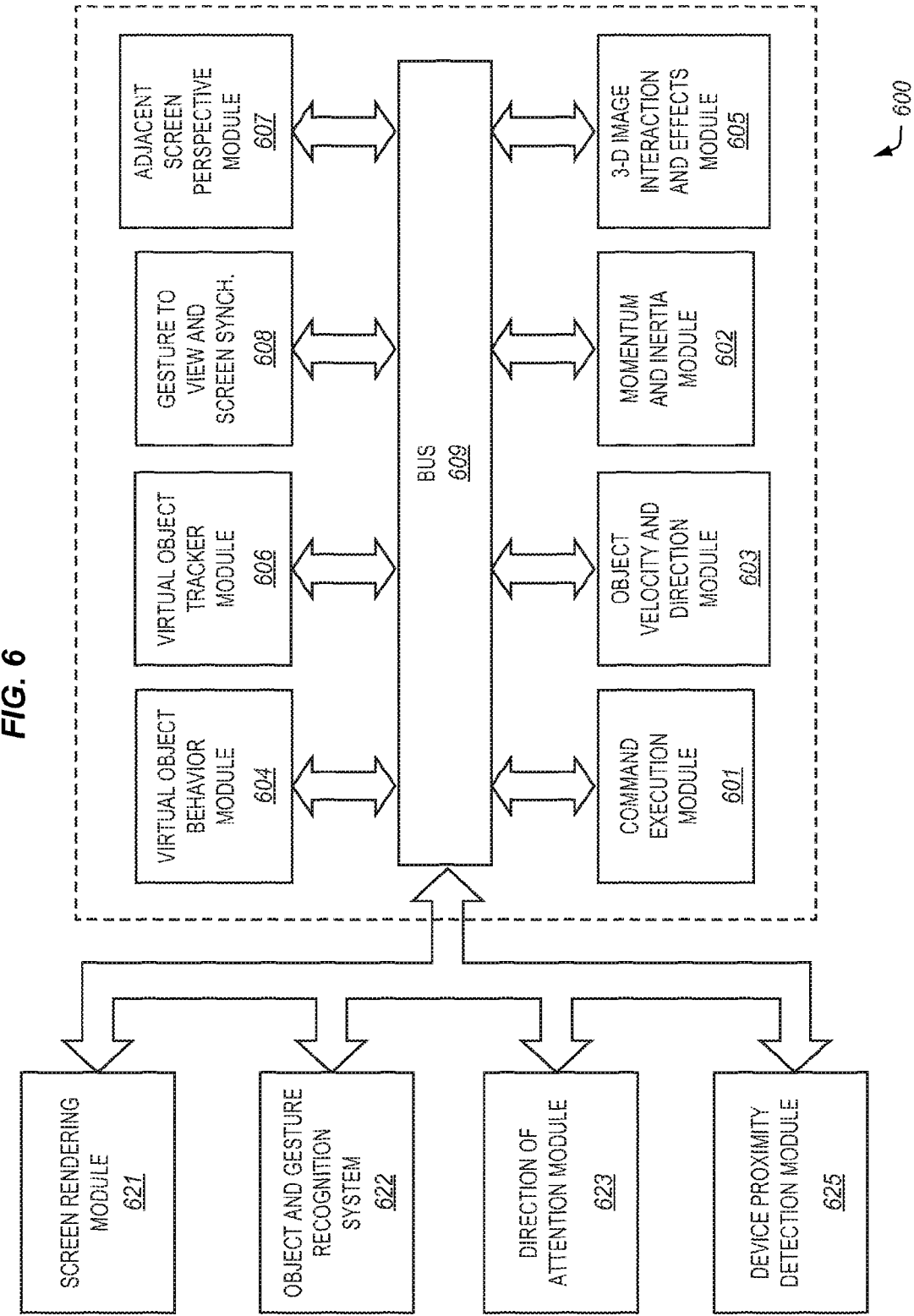
FIG. 6 illustrates computer environment suitable for implementing embodiments of the present disclosure according to one embodiment.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner FIG. 6 illustrates an embodiment of a computing environment 600 capable of supporting the operations discussed above. The modules and systems can be implemented in a variety of different hardware architectures and form factors including that shown in FIG. 9.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor data may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System, using one or more cameras, without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate code filters for coded light depth acquisition in depth images at computing devices, comprising: detection/reception logic to detect a code image of an object comprising pixels of code values and pixels of metadata values including confidence and code transition locations; vertical filter logic to compute a vertical filter to be applied to the code image to smooth out the code transitions along vertical directions; horizontal filter logic to compute a horizontal filter to be applied to the code image to smooth out the code transitions along horizontal directions; consistency filter logic to compute a consistency filter to be applied to the code image to increase an accuracy of the code values and mark inconsistent pixels as invalid; and application/execution logic to apply at least one of one or more of the vertical filter, the horizontal filter, and the consistency filter to filter the digital image; and communication/compatibility logic to output the filtered code image comprising filtered code values and filtered metadata values.

Example 2 includes the subject matter of Example 1, wherein the vertical filter is computed using a sliding window.

Example 3 includes the subject matter of Example 1 or 2, wherein the vertical filter at each position of the window is further computed by detecting a valid code transition in a center row of the window, detecting same valid code transitions in lines above and below the center row of the window, and using the detected valid code transitions to compute new position of a code transition in the center row.

Example 4 includes the subject matter of Example 3, wherein computing the new position of the code transition in the center row of the window is performed to ensure that the code transitions in all the rows lie as close as possible to a straight line, wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row, wherein the sliding window contains three rows.

Example 5 includes the subject matter of Example 1, wherein the horizontal filter is computed using a sliding window.

Example 6 includes the subject matter of Example 1 or 5, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

Example 7 includes the subject matter of Example 6, wherein computing the new position of the code transition in the central pixel is performed to ensure distances between subsequent code transition positions in the window are as sufficiently equal, wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel, wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

Example 8 includes the subject matter of Example 1, wherein the consistency filter is computed by detecting two or more valid code transitions, and changing the code values in the pixels between detected transitions based on the code values at the transitions, wherein changing the code values in the pixels between valid code transitions is performed using a linear interpolation of the code values at the transitions.

Example 9 includes the subject matter of Example 1, wherein the consistency filter is computed by detecting two or more valid code transitions, and changing the code values in the pixels to the left from a leftmost detected transition or to the right from a rightmost detected transition based on the code values at the transitions, wherein changing the code values in the pixels to the right or to the left of the two or more valid code transitions is performed using a linear extrapolation of the code values at the transitions, wherein the consistency filter invalidates pixels located between two invalid transitions.

Some embodiments pertain to Example 10 that includes a method for facilitating code filters for coded light depth acquisition in depth images at computing devices, comprising: detecting a code image of an object comprising pixels of code values and pixels of metadata values including confidence and code transition locations; computing a vertical filter to be applied to the code image to smooth out the code transitions along vertical directions; computing a horizontal filter to be applied to the code image to smooth out the code transitions along horizontal directions; computing a consistency filter to be applied to the code image to increase an accuracy of the code values and mark inconsistent pixels as invalid; applying at least one of one or more of the vertical filter, the horizontal filter, and the consistency filter to filter the digital image; and outputting the filtered code image comprising filtered code values and filtered metadata values.

Example 11 includes the subject matter of Example 10, wherein the vertical filter is computed using a sliding window.

Example 12 includes the subject matter of Example 10 or 11, wherein the vertical filter at each position of the window is further computed by detecting a valid code transition in a center row of the window, detecting same valid code transitions in lines above and below the center row of the window, and using the detected valid code transitions to compute new position of a code transition in the center row.

Example 13 includes the subject matter of Example 12, wherein computing the new position of the code transition in the center row of the window is performed to ensure that the code transitions in all the rows lie as close as possible to a straight line, wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row, wherein the sliding window contains three rows.

Example 14 includes the subject matter of Example 10, wherein the horizontal filter is computed using a sliding window.

Example 15 includes the subject matter of Example 10 or 14, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

Example 16 includes the subject matter of Example 15, wherein computing the new position of the code transition in the central pixel is performed to ensure distances between subsequent code transition positions in the window are as sufficiently equal, wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel, wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

Example 17 includes the subject matter of Example 10, wherein the consistency filter is computed by detecting two or more valid code transitions, and changing the code values in the pixels between detected transitions based on the code values at the transitions, wherein changing the code values in the pixels between valid code transitions is performed using a linear interpolation of the code values at the transitions.

Example 18 includes the subject matter of Example 10, wherein the consistency filter is computed by detecting two or more valid code transitions, and changing the code values in the pixels to the left from a leftmost detected transition or to the right from a rightmost detected transition based on the code values at the transitions, wherein changing the code values in the pixels to the right or to the left of the two or more valid code transitions is performed using a linear extrapolation of the code values at the transitions, wherein the consistency filter invalidates pixels located between two invalid transitions.

Some embodiments pertain to Example 19 includes a system comprising a storage device having instructions, and a processor to execute the instructions to facilitate a mechanism to perform one or more operations comprising: detecting a code image of an object comprising pixels of code values and pixels of metadata values including confidence and code transition locations; computing a vertical filter to be applied to the code image to smooth out the code transitions along vertical directions; computing a horizontal filter to be applied to the code image to smooth out the code transitions along horizontal directions; computing a consistency filter to be applied to the code image to increase an accuracy of the code values and mark inconsistent pixels as invalid; applying at least one of one or more of the vertical filter, the horizontal filter, and the consistency filter to filter the digital image; and outputting the filtered code image comprising filtered code values and filtered metadata values.

Example 20 includes the subject matter of Example 19, wherein the vertical filter is computed using a sliding window.

Example 21 includes the subject matter of Example 19 or 20, wherein the vertical filter at each position of the window is further computed by detecting a valid code transition in a center row of the window, detecting same valid code transitions in lines above and below the center row of the window, and using the detected valid code transitions to compute new position of a code transition in the center row.

Example 22 includes the subject matter of Example 21, wherein computing the new position of the code transition in the center row of the window is performed to ensure that the code transitions in all the rows lie as close as possible to a straight line, wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row, wherein the sliding window contains three rows.

Example 23 includes the subject matter of Example 19, wherein the horizontal filter is computed using a sliding window.

Example 24 includes the subject matter of Example 19 or 23, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

Example 25 includes the subject matter of Example 24, wherein computing the new position of the code transition in the central pixel is performed to ensure distances between subsequent code transition positions in the window are as sufficiently equal, wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel, wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

Example 26 includes the subject matter of Example 19, wherein the consistency filter is computed by detecting two or more valid code transitions, and changing the code values in the pixels between detected transitions based on the code values at the transitions, wherein changing the code values in the pixels between valid code transitions is performed using a linear interpolation of the code values at the transitions.

Example 27 includes the subject matter of Example 19, wherein the consistency filter is computed by detecting two or more valid code transitions, and changing the code values in the pixels to the left from a leftmost detected transition or to the right from a rightmost detected transition based on the code values at the transitions, wherein changing the code values in the pixels to the right or to the left of the two or more valid code transitions is performed using a linear extrapolation of the code values at the transitions, wherein the consistency filter invalidates pixels located between two invalid transitions.

Some embodiments pertain to Example 28 includes an apparatus comprising: means for detecting a code image of an object comprising pixels of code values and pixels of metadata values including confidence and code transition locations; means for computing a vertical filter to be applied to the code image to smooth out the code transitions along vertical directions; means for computing a horizontal filter to be applied to the code image to smooth out the code transitions along horizontal directions; means for computing a consistency filter to be applied to the code image to increase an accuracy of the code values and mark inconsistent pixels as invalid; means for applying at least one of one or more of the vertical filter, the horizontal filter, and the consistency filter to filter the digital image; and means for outputting the filtered code image comprising filtered code values and filtered metadata values.

Example 29 includes the subject matter of Example 28, wherein the vertical filter is computed using a sliding window.

Example 30 includes the subject matter of Example 28 or 29, wherein the vertical filter at each position of the window is further computed by detecting a valid code transition in a center row of the window, means for detecting same valid code transitions in lines above and below the center row of the window, and means for using the detected valid code transitions to compute new position of a code transition in the center row.

Example 31 includes the subject matter of Example 30, wherein computing the new position of the code transition in the center row of the window is performed to ensure that the code transitions in all the rows lie as close as possible to a straight line, wherein computing the new position of the code transition in the center row of the window is performed by means for aggregating detected valid positions of the code transitions in all rows of the window, wherein the aggregation includes one or more of an arithmetic average, the arithmetic average weighted by a distance from the central row, a median, the median weighted by a distance from the central row, wherein the sliding window contains three rows.

Example 32 includes the subject matter of Example 28, wherein the horizontal filter is computed using a sliding window.

Example 33 includes the subject matter of Example 28 or 32, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

Example 34 includes the subject matter of Example 33, wherein computing the new position of the code transition in the central pixel is performed to ensure distances between subsequent code transition positions in the window are as sufficiently equal, wherein computing the new position of the code transition in the central pixel is performed by means for aggregating valid code transition positions to the left and to the right from the central pixel, wherein aggregation includes one or more of an arithmetic average, the arithmetic average weighted by a distance from the central pixel, a median, and the median weighted by a distance from the central pixel, wherein one valid code transition to the left from the central pixel and one valid code transition to the right from the central pixel are used to compute the new position of the code transition in the central pixel, and wherein the computation of the new position of the code transition in the central pixel is performed by means for averaging the code transition positions to the left and to the right from the central pixel.

Example 35 includes the subject matter of Example 28, wherein the consistency filter is computed by means for detecting two or more valid code transitions, and changing the code values in the pixels between detected transitions based on the code values at the transitions, wherein changing the code values in the pixels between valid code transitions is performed using a linear interpolation of the code values at the transitions.

Example 36 includes the subject matter of Example 28, wherein the consistency filter is computed by detecting two or more valid code transitions, and changing the code values in the pixels to the left from a leftmost detected transition or to the right from a rightmost detected transition based on the code values at the transitions, wherein changing the code values in the pixels to the right or to the left of the two or more valid code transitions is performed using a linear extrapolation of the code values at the transitions, wherein the consistency filter invalidates pixels located between two invalid transitions.

Example 37 includes at least one non-transitory or tangible machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims.

Example 44 includes at least one non-transitory or tangible machine-readable medium comprising a plurality of instructions, when executed on a computing device, to implement or perform a method or realize an apparatus as claimed in any preceding claims.

Example 45 includes a system comprising a mechanism to implement or perform a method or realize an apparatus as claimed in any preceding claims.

Example 46 includes an apparatus comprising means to perform a method as claimed in any preceding claims.

Example 47 includes a computing device arranged to implement or perform a method or realize an apparatus as claimed in any preceding claims.

Example 48 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   an input/output (I/O) hardware component having embedded detection/reception logic to detect a code image of an object comprising pixels of code values and pixels of metadata values including confidence and code transition locations, wherein the I/O hardware component includes a camera and is coupled to memory and a processing device;
   vertical filter logic, as facilitated by or at least partially embedded in the processing device, to compute a vertical filter to be applied to the code image to smooth out the code transitions along vertical directions;
   horizontal filter logic, as facilitated by or at least partially embedded in the processing device, to compute a horizontal filter to be applied to the code image to smooth out the code transitions along horizontal directions;
   consistency filter logic, as facilitated by or at least partially embedded in the processing device, to compute a consistency filter to be applied to the code image to increase an accuracy of the code values and mark inconsistent pixels as invalid;
   application/execution logic, as facilitated by or at least partially embedded in the processing device, to apply at least one of one or more of the vertical filter, the horizontal filter, and the consistency filter to filter the digital image; and
   communication/compatibility logic, as facilitated by or at least partially embedded in the processing device, to output the filtered code image comprising filtered code values and filtered metadata values.

2. The apparatus of claim 1, wherein the vertical filter is computed using a sliding window.

3. The apparatus of claim 2, wherein the vertical filter at each position of the window is further computed by detecting a valid code transition in a center row of the window, detecting same valid code transitions in lines above and below the center row of the window, and using the detected valid code transitions to compute new position of a code transition in the center row.

4. The apparatus of claim 3, wherein computing the new position of the code transition in the center row of the window is performed to ensure that the code transitions in all the rows lie as close as possible to a straight line,
   wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row,
   wherein the sliding window contains three rows.

5. The apparatus of claim 1, wherein the horizontal filter is computed using a sliding window.

6. The apparatus of claim 5, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

7. The apparatus of claim 6, wherein computing the new position of the code transition in the central pixel is performed to ensure distances between subsequent code transition positions in the window are as sufficiently equal,
wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel,
wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

8. The apparatus of claim 1, wherein the consistency filter is computed by detecting two or more valid code transitions, and changing the code values in the pixels between detected transitions based on the code values at the transitions,
wherein changing the code values in the pixels between valid code transitions is performed using a linear interpolation of the code values at the transitions.

9. The apparatus of claim 1, wherein the consistency filter is computed by detecting two or more valid code transitions, and changing the code values in the pixels to the left from a leftmost detected transition or to the right from a rightmost detected transition based on the code values at the transitions,
wherein changing the code values in the pixels to the right or to the left of the two or more valid code transitions is performed using a linear extrapolation of the code values at the transitions,
wherein the consistency filter invalidates pixels located between two invalid transitions.

10. A method comprising:
detecting a code image of an object comprising pixels of code values and pixels of metadata values including confidence and code transition locations;
computing a vertical filter to be applied to the code image to smooth out the code transitions along vertical directions;
computing a horizontal filter to be applied to the code image to smooth out the code transitions along horizontal directions;
computing a consistency filter to be applied to the code image to increase an accuracy of the code values and mark inconsistent pixels as invalid;
applying at least one of one or more of the vertical filter, the horizontal filter, and the consistency filter to filter the digital image; and
outputting the filtered code image comprising filtered code values and filtered metadata values.

11. The method of claim 10, wherein the vertical filter is computed using a sliding window.

12. The method of claim 11, wherein the vertical filter at each position of the window is further computed by detecting a valid code transition in a center row of the window, detecting same valid code transitions in lines above and below the center row of the window, and using the detected valid code transitions to compute new position of a code transition in the center row.

13. The method of claim 12, wherein computing the new position of the code transition in the center row of the window is performed to ensure that the code transitions in all the rows lie as close as possible to a straight line,
wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row,
wherein the sliding window contains three rows.

14. The method of claim 10, wherein the horizontal filter is computed using a sliding window.

15. The method of claim 14, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

16. The method of claim 15, wherein computing the new position of the code transition in the central pixel is performed to ensure distances between subsequent code transition positions in the window are as sufficiently equal,
wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel,
wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

17. The method of claim 10, wherein the consistency filter is computed by detecting two or more valid code transitions, and changing the code values in the pixels between detected transitions based on the code values at the transitions,
wherein changing the code values in the pixels between valid code transitions is performed using a linear interpolation of the code values at the transitions.

18. The method of claim 10, wherein the consistency filter is computed by detecting two or more valid code transitions, and changing the code values in the pixels to the left from a leftmost detected transition or to the right from a rightmost detected transition based on the code values at the transitions,
wherein changing the code values in the pixels to the right or to the left of the two or more valid code transitions is performed using a linear extrapolation of the code values at the transitions,
wherein the consistency filter invalidates pixels located between two invalid transitions.

19. At least one non-transitory machine-readable medium comprising a plurality of instructions, executed on a computing device, to facilitate the computing device to perform operations comprising:
- detecting a code image of an object comprising pixels of code values and pixels of metadata values including confidence and code transition locations;
- computing a vertical filter to be applied to the code image to smooth out the code transitions along vertical directions;
- computing a horizontal filter to be applied to the code image to smooth out the code transitions along horizontal directions;
- computing a consistency filter to be applied to the code image to increase an accuracy of the code values and mark inconsistent pixels as invalid;
- applying at least one of one or more of the vertical filter, the horizontal filter, and the consistency filter to filter the digital image; and
- outputting the filtered code image comprising filtered code values and filtered metadata values.

20. The non-transitory machine-readable medium of claim 19, wherein the vertical filter is computed using a sliding window, wherein the vertical filter at each position of the window is further computed by detecting a valid code transition in a center row of the window, detecting same valid code transitions in lines above and below the center row of the window, and using the detected valid code transitions to compute new position of a code transition in the center row.

21. The non-transitory machine-readable medium of claim 20, wherein computing the new position of the code transition in the center row of the window is performed to ensure that the code transitions in all the rows lie as close as possible to a straight line,
- wherein computing the new position of the code transition in the center row of the window is performed by aggregating detected valid positions of the code transitions in all rows of the window, wherein the aggregation includes one or more of an arithmetic average, the arithmetic average weighted by a distance from the central row, a median, the median weighted by a distance from the central row,
- wherein the sliding window contains three rows.

22. The non-transitory machine-readable medium of claim 19, wherein the horizontal filter is computed using a sliding window, wherein the horizontal filter at each position of the window is further computed by detecting a valid code transition in a central pixel of the window, detecting valid code transitions to a left and to a right from the central pixel, and using the detected valid code transitions to compute a new position of a code transition in the central pixel.

23. The non-transitory machine-readable medium of claim 22, wherein computing the new position of the code transition in the central pixel is performed to ensure distances between subsequent code transition positions in the window are as sufficiently equal,
- wherein computing the new position of the code transition in the central pixel is performed by aggregating valid code transition positions to the left and to the right from the central pixel, wherein aggregation includes one or more of an arithmetic average, the arithmetic average weighted by a distance from the central pixel, a median, and the median weighted by a distance from the central pixel,
- wherein one valid code transition to the left from the central pixel and one valid code transition to the right from the central pixel are used to compute the new position of the code transition in the central pixel, and wherein the computation of the new position of the code transition in the central pixel is performed by averaging the code transition positions to the left and to the right from the central pixel.

24. The non-transitory machine-readable medium of claim 19, wherein the consistency filter is computed by detecting two or more valid code transitions, and changing the code values in the pixels between detected transitions based on the code values at the transitions,
- wherein changing the code values in the pixels between valid code transitions is performed using a linear interpolation of the code values at the transitions.

25. The non-transitory machine-readable medium of claim 19, wherein the consistency filter is computed by detecting two or more valid code transitions, and changing the code values in the pixels to the left from a leftmost detected transition or to the right from a rightmost detected transition based on the code values at the transitions,
- wherein changing the code values in the pixels to the right or to the left of the two or more valid code transitions is performed using a linear extrapolation of the code values at the transitions,
- wherein the consistency filter invalidates pixels located between two invalid transitions.

* * * * *